(12) United States Patent
Chen et al.

(10) Patent No.: US 9,548,035 B2
(45) Date of Patent: Jan. 17, 2017

(54) PIXEL STRUCTURE HAVING MULTIPLE SWITCHING UNITS, LIQUID CRYSTAL DISPLAY USING THE SAME, AND DRIVING METHOD OF THE SAME

(71) Applicant: Shenzhen China Star Optoelectronics Technology Co., Ltd., Shenzhen, Guangdong (CN)

(72) Inventors: Cheng-hung Chen, Shenzhen (CN); Jiali Jiang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 55 days.

(21) Appl. No.: 14/233,377

(22) PCT Filed: Oct. 23, 2013

(86) PCT No.: PCT/CN2013/085778
§ 371 (c)(1),
(2) Date: Jan. 16, 2014

(87) PCT Pub. No.: WO2015/043035
PCT Pub. Date: Apr. 2, 2015

(65) Prior Publication Data
US 2015/0109282 A1  Apr. 23, 2015

(30) Foreign Application Priority Data
Sep. 25, 2013  (CN) .......................... 2013 1 0443309

(51) Int. Cl.
G09G 3/36 (2006.01)
G02F 1/1362 (2006.01)
G09G 3/00 (2006.01)

(52) U.S. Cl.
CPC ......... *G09G 3/3677* (2013.01); *G02F 1/13624* (2013.01); *G02F 1/136213* (2013.01);
(Continued)

(58) Field of Classification Search
CPC ..................................................... G09G 3/3677
(Continued)

(56) References Cited

U.S. PATENT DOCUMENTS

2013/0021385 A1* 1/2013 Hou ..................... G09G 3/3659
345/690
2013/0100108 A1* 4/2013 Chiang ................ G09G 3/3659
345/212
(Continued)

FOREIGN PATENT DOCUMENTS

CN    102445796 A    5/2012

*Primary Examiner* — Chanh Nguyen
*Assistant Examiner* — Daniel Duong
(74) *Attorney, Agent, or Firm* — Andrew C. Cheng (57) ABSTRACT

The present invention provides a liquid crystal display device, a pixel structure and a driving method. The first scanning line of the first scanning line transmits a scanning signal of the first switching unit, charging the pixel electrode, after the charge, when the pixel electrode is in the state of holding power, the second scanning line transmits the second scanning signal to turn on the second switching unit, the common electrode line provides the common voltage to the pixel electrode, in order to rise the pixel electrode voltage to the common voltage. Through the above ways, on one hand the present invention can ensure the charging time of the pixel electrode and the resolution of the liquid crystal display device, on the other hand inserting the black image, achieving the inserting black image technique, reducing the 3D cross talk.

12 Claims, 5 Drawing Sheets

(52) U.S. Cl.
CPC ..... *G09G 3/003* (2013.01); *G09G 2300/0426* (2013.01); *G09G 2300/0478* (2013.01); *G09G 2300/0852* (2013.01); *G09G 2310/0251* (2013.01); *G09G 2320/0209* (2013.01)

(58) Field of Classification Search
USPC .......................................................... 345/87
See application file for complete search history.

(56) References Cited

U.S. PATENT DOCUMENTS

2015/0022510 A1* 1/2015 Yao .................. G09G 3/3659
            345/211
2015/0109275 A1* 4/2015 Chen .................. G09G 3/003
            345/211

* cited by examiner

PIXEL STRUCTURE HAVING MULTIPLE SWITCHING UNITS, LIQUID CRYSTAL DISPLAY USING THE SAME, AND DRIVING METHOD OF THE SAME

BACKGROUND OF THE INVENTION

1. Field of the Invention

The present invention relates to the field of display techniques, and in particular to a liquid crystal display, a pixel structure and a driving method.

2. The Related Arts

The 3D Shutter Glass technology commonly has a problem that cross talk is too large, in order to solve this issue, currently, there are two common solutions in the present technique:

The first solution is BLU Scanning Mode, the basic frequency is 120 Hz; the second one is Black Insertion, namely, it is BLU Blinking Mode, which is achieved by inserting a black image during the signals of the right and left eyes switching, for example, after the end of the frame in the right eye, inserting a black image, and scanning the frame in the left eye. However, these two methods have certain limitations currently.

Wherein, the first solution is limited by its scanning method, BLU is required being single-short or double-short design, and the effectiveness of improving cross talk is poor. The second solution needs inserting a black image during the signals of the right and left eyes switching, so it is requires the higher refresh rate, which is commonly 240 Hz, it will reduce the charging time to half of 120 Hz, making the panel be at the risk of insufficient charge, furthermore, leading the emergence of mura, extremely affecting the quality of liquid crystal display device.

SUMMARY OF THE INVENTION

The technical issue to be solved by the present invention is to provide a liquid crystal display device, a pixel structure and a driving method, on one hand which can ensure the charging time and the resolution of the liquid crystal display device, on the other hand which can also achieve the inserting black image technique, furthermore, reducing the 3D cross talk. In order to solve the technical issue, one technical solution adopted by the present invention is to provide a pixel structure, the pixel structure comprises a data line, a first scanning line which is orthogonal to the data line, a second scanning line which is in parallel with the first scanning line, a pixel electrode which is provided between the first scanning line and the second scanning line and a common electrode line which is used for providing common voltage, the pixel structure also comprises the first switching unit which is electrically connected with the first scanning line and the second scanning unit which is electrically connected with the second scanning line; wherein, the first scanning line is used to transmit a scanning signal of the first switching unit, the data line provides a pixel electrode voltage to the pixel electrode through the first switching unit which has turned on, charging the pixel electrode. After the charge, when the pixel electrode is in the state of holding power, the second scanning line transmits the second scanning signal to turn on the second switching unit, the common electrode line provides the common voltage to the pixel electrode through the second switching unit which has turned on, in order to rise the pixel electrode voltage to the common voltage.

Wherein, the gate of the first switching unit is electrically connected to the first scanning line, the source of the first switching unit is electrically connected to the data line, the drain of the first switching unit is electrically connected to the pixel electrode; the gate of the second switching unit is electrically connected to the second scanning line, the source of the second switching unit is electrically connected to the common electrode line, the drain of the second switching unit is electrically connected to the pixel electrode.

Wherein, the period of the first scanning signal is t1 the second scanning line transmits the second scanning signal in the ½ t1 of the first scanning signal.

Wherein, the pixel electrode comprises a first sub pixel electrode and a second sub pixel electrode, the common electrode line comprises a first common electrode line and a second common electrode line, the first switching unit comprises a first switch, a second switch and a third switch, the second switching unit comprises a fourth switch and a fifth switch, the first scanning line comprises a first sub scanning line and a second sub scanning line, the first scanning signal comprises a first sub scanning signal and a second sub scanning signal; wherein, the first sub scanning line is used to transmit the first sub scanning signal which turns on the first switch and the second switch, the data line provides the pixel electrode voltage to the first sub pixel electrode and the second sub pixel electrode through the first switch and the second switch which have turned on, charging the first sub pixel electrode and the second sub pixel electrode. After the charge, the second sub scanning line transmits the second sub scanning signal to turn on the third switch, the first sub pixel electrode and the second sub pixel electrode discharge. After the discharge, the first sub pixel electrode and the second sub pixel electrode are in the state of holding power, the second scanning line transmits the second scanning signal, in order to turn on the fourth switch and the fifth switch, the first common electrode line and the second common electrode line respectively provide the common voltage to the first sub pixel electrode and the second sub pixel electrode through the fourth switch and the fifth switch which have turned on, in order to rise the pixel electrode voltage to the common voltage.

Wherein, the first sub switch is electrically connected with the first sub scanning line, the data line and the first sub pixel electrode; the second switch is electrically connected with the first sub scanning line, the data line and the second sub pixel electrode; the third switch is electrically connected with the second sub scanning line, the common electrode line and the fifth switch; the fourth switch is electrically connected with the first sub pixel electrode, the second scanning line and the first common electrode; the fifth switch is electrically connected with the second sub pixel electrode, the second scanning line and the second common electrode.

Wherein, the gate of the first switch is electrically connected to the first sub scanning line, the source of the first switch is electrically connected to the data line, the drain of the first switch is electrically connected to the first sub pixel electrode: the gate of the second switch is electrically connected to the first sub scanning line, the source of the second switch is electrically connected to the data line, the drain of the second switch is electrically connected to the second sub pixel electrode; the gate of the third switch is electrically connected to the second sub scanning line, the source of the third switch is electrically connected to the common electrode line, the drain of the third switch is electrically connected to the drain of the fifth switch; the gate of the fourth switch is electrically connected to the second scanning line, the source of the fourth switch is electrically connected to the first common electrode line, the drain of the fourth switch is electrically connected to the first sub pixel electrode; the gate of the fifth switch is electrically connected to the second scanning line, the source of the fifth switch is electrically connected to the second common electrode line, the drain of the fifth switch is electrically connected to the second sub pixel electrode.

Wherein, the period of the first sub scanning signal is t11 the second scanning line transmits the second scanning signal in the ½ t11 of the first sub scanning signal.

In order to solve the technical issue, another technical solution adopted by the present invention is to provide a liquid crystal display device, the liquid crystal display device comprises an oppositely disposed array substrate and a color film substrate, wherein, the array substrate comprises a pixel structure, the pixel structure comprises a data line, a first scanning line which is orthogonal to the data line, a second scanning line which is in parallel with the first scanning line, a pixel electrode which is provided between the first scanning line and the second scanning line and a common electrode line which is used for providing common voltage, the pixel structure also comprises the first switching unit which is electrically connected with the first scanning line and the second scanning unit which is electrically connected with the second scanning line; wherein, the first scanning line is used to transmit a scanning signal of the first switching unit, the data line provides a pixel electrode voltage to the pixel electrode through the first switching unit which has turned on, charging the pixel electrode. After the charge, when the pixel electrode is in the state of holding power, the second scanning line transmits the second scanning signal to turn on the second switching unit, the common electrode line provides the common voltage to the pixel electrode through the second switching unit which has turned on, in order to rise the pixel electrode voltage to the common voltage.

Wherein, the gate of the first switching unit is electrically connected to the first scanning line, the source of the first switching unit is electrically connected to the data line, the drain of the first switching unit is electrically connected to the pixel electrode; the gate of the second switching unit is electrically connected to the second scanning line, the source of the second switching unit is electrically connected to the common electrode line, the drain of the second switching unit is electrically connected to the pixel electrode.

Wherein, the period of the first scanning signal is t1, the second scanning line transmits the second scanning signal in the ½ t1 of the first scanning signal.

Wherein, the pixel electrode comprises a first sub pixel electrode and a second sub pixel electrode, the common electrode line comprises a first common electrode line and a second common electrode line, the first switching unit comprises a first switch, a second switch and a third switch, the second switching unit comprises a fourth switch and a fifth switch, the first scanning line comprises a first sub scanning line and a second sub scanning line, the first scanning signal comprises a first sub scanning signal and a second sub scanning signal; wherein, the first sub scanning line is used to transmit the first sub scanning signal which turns on the first switch and the second switch, the data line provides the pixel electrode voltage to the first sub pixel electrode and the second sub pixel electrode through the first switch and the second switch which have turned on, charging the first sub pixel electrode and the second sub pixel electrode. After the charge, the second sub scanning line transmits the second sub scanning signal to turn on the third switch, the first sub pixel electrode and the second sub pixel electrode discharge. After the discharge, the first sub pixel electrode and the second sub pixel electrode are in the state of holding power, the second scanning line transmits the second scanning signal, in order to turn on the fourth switch and the fifth switch, the first common electrode line and the second common electrode line respectively provide the common voltage to the first sub pixel electrode and the second sub pixel electrode through the fourth switch and the fifth switch which have turned on, in order to rise the pixel electrode voltage to the common voltage.

Wherein, the first sub switch is electrically connected with the first sub scanning line, the data line and the first sub pixel electrode; the second switch is electrically connected with the first sub scanning line, the data line and the second sub pixel electrode; the third switch is electrically connected with the second sub scanning line, the common electrode line and the fifth switch; the fourth switch is electrically connected with the first sub pixel electrode, the second scanning line and the first common electrode; the fifth switch is electrically connected with the second sub pixel electrode, the second scanning line and the second common electrode.

Wherein, the gate of the first switch is electrically connected to the first sub scanning line, the source of the first switch is electrically connected to the data line, the drain of the first switch is electrically connected to the first sub pixel electrode; the gate of the second switch is electrically connected to the first sub scanning line, the source of the second switch is electrically connected to the data line, the drain of the second switch is electrically connected to the second sub pixel electrode; the gate of the third switch is electrically connected to the second sub scanning line, the source of the third switch is electrically connected to the common electrode line, the drain of the third switch is electrically connected to the drain of the fifth switch; the gate of the fourth switch is electrically connected to the second scanning line, the source of the fourth switch is electrically connected to the first common electrode line, the drain of the fourth switch is electrically connected to the first sub pixel electrode; the gate of the fifth switch is electrically connected to the second scanning line, the source of the fifth switch is electrically connected to the second common electrode line, the drain of the fifth switch is electrically connected to the second sub pixel electrode.

Wherein, the period of the first sub scanning signal is t11, the second scanning line transmits the second scanning signal in the ½ t11 of the first sub scanning signal.

In order to solve the technical issue, the other technical solution adopted by the present invention is to provide a driving method of the pixel structure, the pixel structure comprises a data line, a first scanning line which is orthogonal to the data line, a second scanning line which is in parallel with the first scanning line, a pixel electrode which is provided between the first scanning line and the second scanning line and a common electrode line which is used for providing common voltage, the pixel structure also comprises the first switching unit which is electrically connected with the first scanning line and the second scanning unit which is electrically connected with the second scanning line, wherein, the driving method comprises the following steps: the first scanning line is used to transmit a scanning signal of the first switching unit; the data line provides a pixel electrode voltage to the pixel electrode through the first switching unit which has turned on, charging the pixel electrode; after the charge, when the pixel electrode is in the state of holding power, the second scanning line transmits the second scanning signal to turn on the second switching unit; the common electrode line provides the common voltage to the pixel electrode through the second switching unit which has turned on, in order to rise the pixel electrode voltage to the common voltage.

Wherein, the period of the first scanning signal is t1, the second scanning line transmits the second scanning signal in the ½ t1 of the first scanning signal.

The benefits in present invention are as follows. Differing from the situation of the prior art, the present invention provides a pixel structure, the pixel structure comprises a data line, a first scanning line, a second scanning line, a pixel electrode, a common electrode line, a first switching unit and a second switching unit, wherein, the first scanning line is used to transmit a scanning signal of the first switching unit, the data line provides a pixel electrode voltage to the pixel electrode through the first switching unit which has turned on, charging the pixel electrode. After the charge, when the pixel electrode is in the state of holding power, the second scanning line transmits the second scanning signal to turn on the second switching unit, the common electrode line provides the common voltage to the pixel electrode through the second switching unit which has turned on, in order to rise the pixel electrode voltage to the common voltage. Through the above ways, the first scanning line in the present invention mainly operates during the charging time of the pixel electrode, after the charge, the second scanning line starts working when the pixel electrode is in the state of holding power, in order to rise the pixel electrode voltage to the common voltage, achieving that inserting the black image. The operations of the second scanning line and the first scanning line are mutually independent and non-interfering. The second scanning line doesn't affect the refresh rate of the first scanning line, therefore, ensuring the charging time of the pixel electrode. Furthermore, it only needs the first scanning line operating during the charging time of the pixel electrode, which makes the resolution been higher in the present invention. Therefore, on one hand the present invention can ensure the charging time of the pixel electrode and the resolution of the liquid crystal display device, on the other hand it can also achieve the inserting black image technique, further reducing the 3D cross talk.

DETAILED DESCRIPTION OF THE PREFERRED EMBODIMENTS

The detailed descriptions accompanying drawings and the embodiment of the present invention are as follows.

Figure 1:
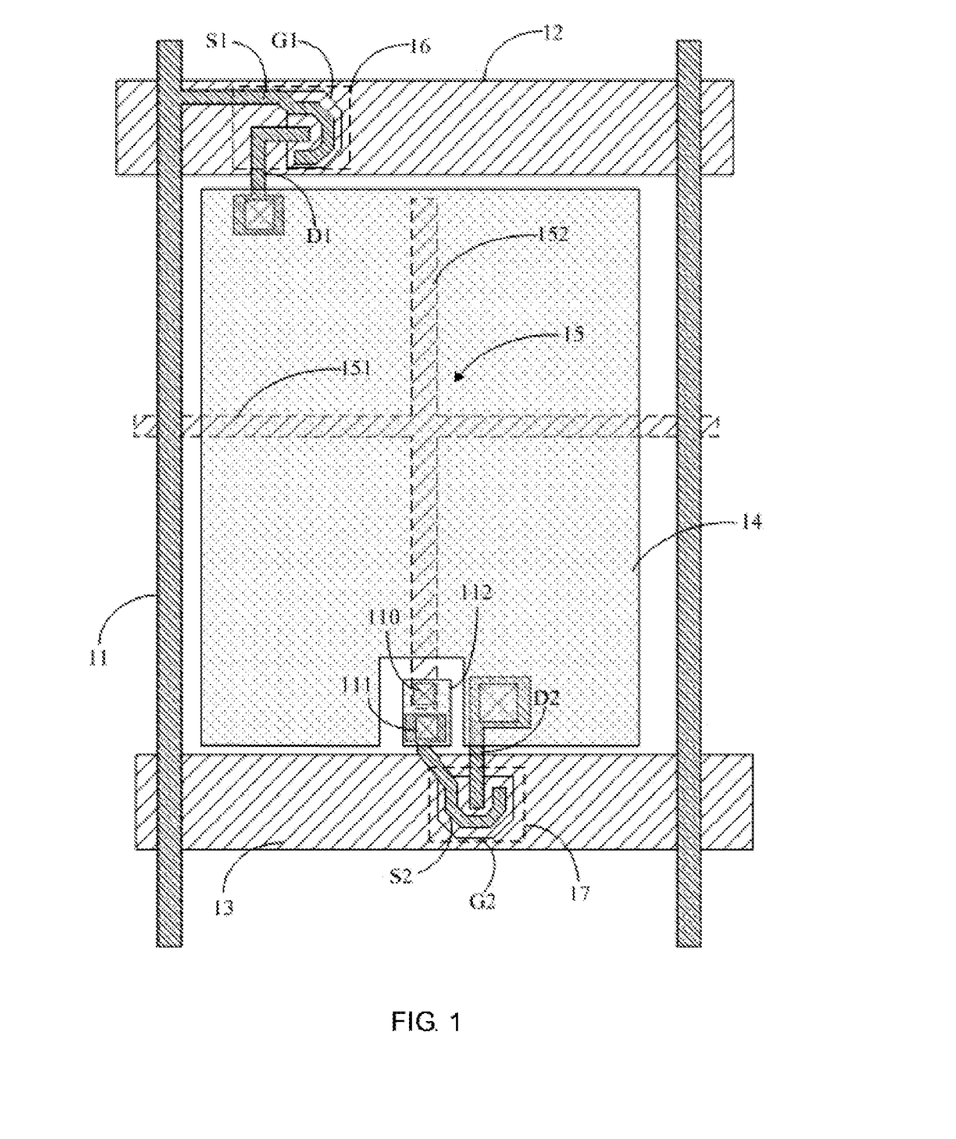
FIG. 1 is a schematic structural diagram of an embodiment of the pixel structure in the present invention.
Figure 2:
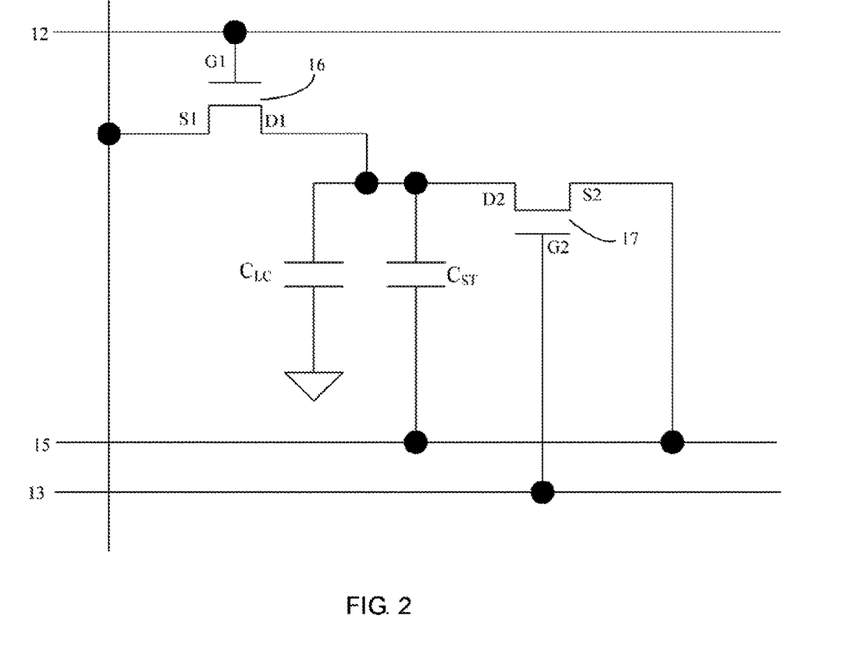
FIG. 2 is equivalent circuit diagram of the pixel structure shown in FIG. 1.

Referring to FIG. 1 and FIG. 2, FIG. 1 is a schematic structural diagram of an embodiment of the pixel structure in the present invention, FIG. 2 is a equivalent circuit diagram of the pixel structure shown in FIG. 1. As shown in FIG. 1 and FIG. 2, the pixel structure 10 in the present invention comprises a data line 11, a first scanning line 12 which is orthogonal to the data line 11, a second scanning line 13 which is in parallel with the first scanning line 12, a pixel electrode 14 which is provided between the first scanning line 12 and the second scanning line 13 and a common electrode line 15 which is used for providing common voltage, the pixel structure 10 also comprises the first switching unit 16 which is electrically connected with the first scanning line 12 and the second switching unit 17 which is electrically connected with the second scanning line 13.

In the present embodiment, the gate G1 of the first switching unit 16 is electrically connected to the first scanning line 12, the source S1 of the first switching unit 16 is electrically connected to the data line 11, and the drain D1 of the first switching unit 16 is electrically connected to the pixel electrode 14.

The gate G2 of the second switching unit 17 is electrically connected to the second scanning line 13, the source S2 of the second switching unit 17 is electrically connected to the common electrode line 15, and the drain D2 of the second switching unit 17 is electrically connected to the pixel electrode 14. Wherein, the common electrode 15 is constituted by two perpendicular and intersecting branches 151 and 152, Disposing an opening 111 above the source S2 of the second switching unit 17, disposing the other opening 110 above the branch 152 of the common electrode line 15, a conductive layer 112 connects the source S2 of the second switching unit 17 to the branch 152 of the common electrode line 15 through the openings 110 and 111. The material of the conductive layer 112 is preferably the same as the pixel electrode 14.

In the present embodiment, there is a liquid crystal layer (not shown) disposed above the pixel electrode 14, the common electrode line 15 is disposed below the pixel electrode 14. Therefore, a liquid crystal capacitor CLC is formed between the pixel electrode 14 and the liquid crystal layer, a storage capacitor CST (as shown in FIG. 2) is formed between the pixel electrode 14 and the common electrode line 15.

Notably, the pixel structure 10 shown in FIG. 1 represents one of pixel structure in the equivalent circuit shown in FIG. 2. The protective range of the present invention is that as long as meeting the pixel structure in the circuit shown in FIG. 2.

Figure 3:
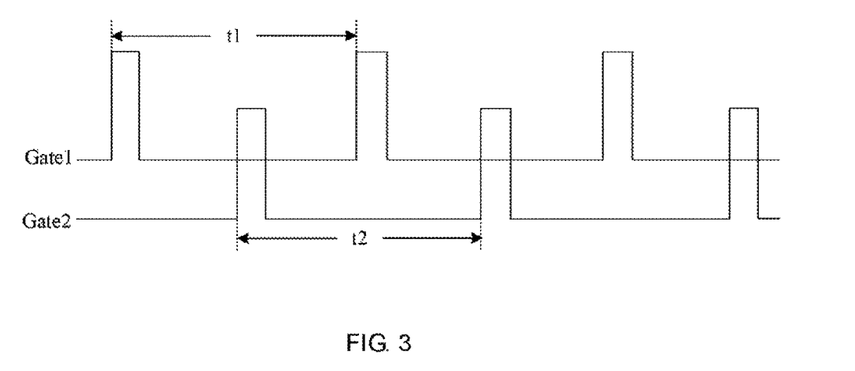
FIG. 3 is a driving waveform of the first scanning line and the second scanning line shown in FIG. 1.

The following describes the working principle of the pixel structure 10:

Referring to FIG. 3, FIG. 3 is a driving waveform of the first scanning line 12 and the second scanning line 13 of the pixel structure 10. The first scanning line 12 is used to transmit a scanning signal Gate1 of turning on the first switching unit 16, the data line 11 provides a pixel electrode voltage to the pixel electrode 14 through the first switching unit 16 which has turned on, charging the pixel electrode 14. After the charge, when the pixel electrode 14 is in the state of holding power, the second scanning line 13 transmits the second scanning signal Gate2 to turn on the second switching unit 17, the common electrode line 15 provides the common voltage to the pixel electrode 14 through the second switching unit 17 which has turned on, in order to rise the pixel electrode voltage to the common voltage, achieving that inserting the black image.

In the present embodiment, the period t1 of the first scanning signal Gate1 is the same as the period t2 of the second scanning signal Gate2, the second scanning line 13 transmits the second scanning signal in the ½ t1 of the first scanning signal Gate2.

As the above description, because the pixel structure 10 comprises the first scanning line 12 and the second scanning line 13, the first scanning line 12 mainly operates during the charging time of the pixel electrode 14, the second scanning line 13 mainly transmits the second scanning signal Gate2 when the pixel electrode 14 is in the state of holding power after the charge, rising the pixel electrode voltage to the common voltage, achieving that inserting the black image. The operations of the second scanning line 13 and the first scanning line 12 are mutually independent and non-interfering. The second scanning line 13 doesn't affect the refresh rate of the first scanning line 12, therefore, ensuring the charging time of the pixel electrode.

Furthermore, it only needs the first scanning line 12 operating during the charging time of the pixel electrode 14, which makes the resolution been higher in the present embodiment.

Therefore, on one hand the pixel structure 10 of the present invention can ensure the charging time of the pixel electrode 14 and the resolution of the liquid crystal display device, on the other hand it can also achieve the inserting black image technique, further reducing the 3D cross talk.

Figure 4:
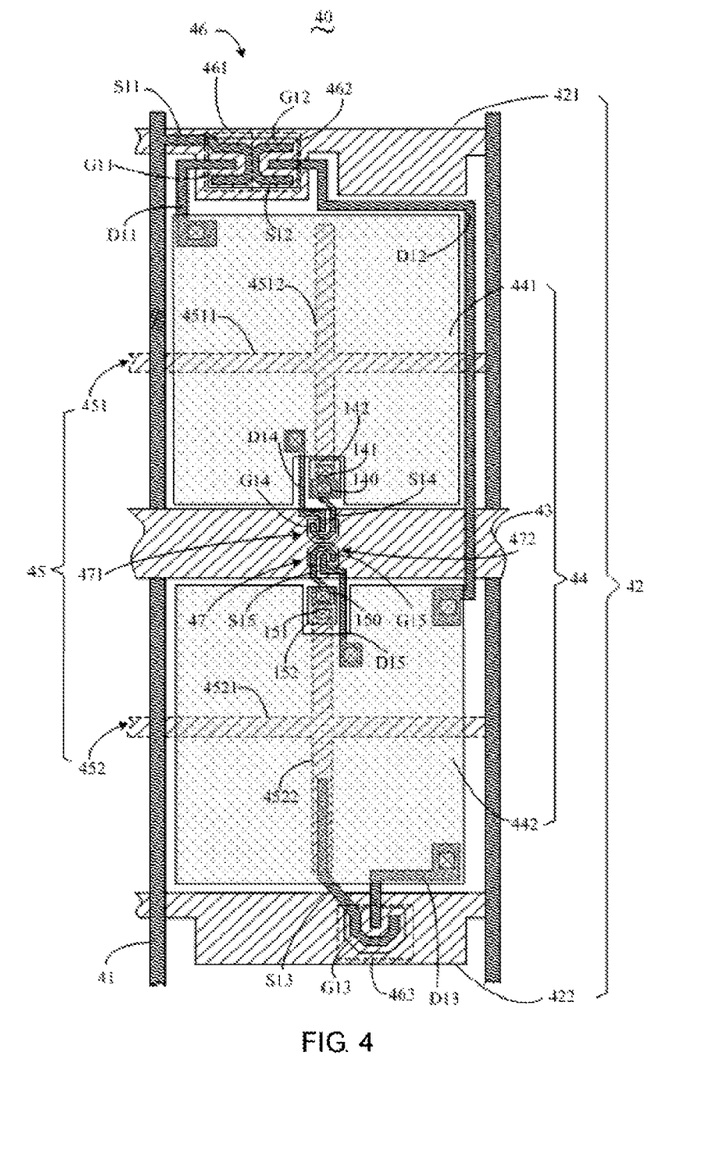
FIG. 4 is a schematic structural diagram of the other embodiment of the pixel structure in the present invention.
Figure 5:
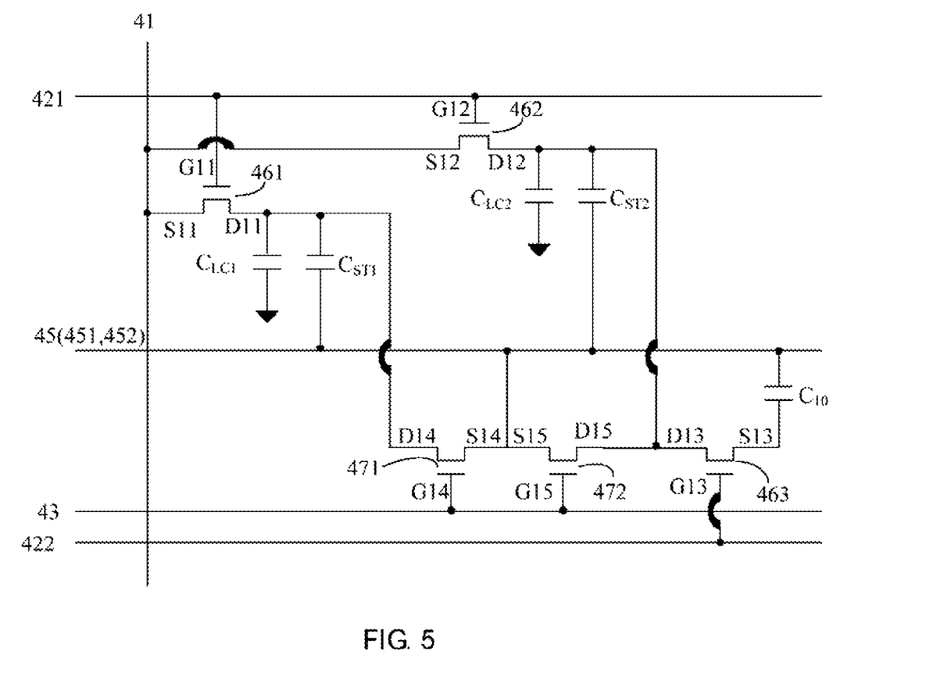
FIG. 5 is a equivalent circuit diagram of the pixel structure shown in FIG. 4.

The present invention also provides the other pixel structure, which is described in detail on the basis of the above pixel structure. Referring to FIG. 4 and FIG. 5, the pixel structure 40 comprises a data line 41, a first scanning line 42 which is orthogonal to the data line, a second scanning line 43 which is in parallel with the first scanning line 42, a pixel electrode 44 which is provided between the first scanning line 42 and the second scanning line 43 and a common electrode line 45 which is used for providing common voltage, the pixel structure 40 also comprises the first switching unit 46 which is electrically connected with the first scanning line 42 and the second switching unit 47 which is electrically connected with the second scanning line 43, wherein, the structures of the data line 41, the first scanning line 42, the second scanning line 43, the pixel electrode 44, the common electrode line 45, the first switching unit 46 and the second switching unit 47 are respectively the same as the data line 11, the first scanning line 12, the second scanning line 13, the pixel electrode 14, the common electrode line 15, the first switching unit 16 and the second switching unit 17 shown in FIG. 1.

The pixel structure 40 of the present embodiment is a wide angle pixel structure. Specifically, the pixel electrode 44 in the present embodiment comprises a first sub pixel electrode 441 and a second sub pixel electrode 442, the common electrode line 45 comprises a first common electrode line 451 and a second common electrode line 452, the first switching unit 46 comprises a first switch 461, a second switch 462 and a third switch 463, the second switching unit 47 comprises a fourth switch 471 and a fifth switch 472, the first scanning line 42 comprises a first sub scanning line 421 and a second sub scanning line 422, the first scanning signal Gate1 comprises a first sub scanning signal Gate11 and a second sub scanning signal Gate12. Wherein, the first sub switch 461 is electrically connected with the first sub scanning line 421, the data line 41 and the first sub pixel electrode 441. The second switch 462 is electrically connected with the first sub scanning line 421, the data line 41 and the second sub pixel electrode 442. The third switch 463 is electrically connected with the second sub scanning line 422, the common electrode line 45 and the fifth switch 472. The fourth switch 471 is electrically connected with the first sub pixel electrode 441, the second scanning line 43 and the first common electrode 451. The fifth switch 472 is electrically connected with the second sub pixel electrode 442, the second scanning line 43 and the second common electrode 452.

Specifically, the gate G11 of the first switch 461 is electrically connected to the first sub scanning line 421, the source S11 of the first switch 461 is electrically connected to the data line 41, the drain D11 of the first switch 461 is electrically connected to the first sub pixel electrode 441.

The gate G12 of the second switch 462 is electrically connected to the first sub scanning line 421, the source S12 of the second switch 462 is electrically connected to the data line 41, the drain D12 of the second switch 462 is electrically connected to the second sub pixel electrode 442.

The gate G13 of the third switch 363 is electrically connected to the second sub scanning line 422, the source S13 of the third switch 463 is electrically connected to the common electrode line 45, the drain D13 of the third switch 463 is electrically connected to the drain D15 of the fifth switch 472. Wherein, the first common electrode line 451 is constituted by two perpendicular and intersecting branches 4511 and 4512, the second common electrode line 352 is constituted by two perpendicular and intersecting branches 4521 and 4522. There is a sharing capacitor C10 (as shown in FIG. 5) formed between the source S13 of the third switch 463 and branch 4522.

The gate G14 of the fourth switch 471 is electrically connected to the second scanning line 43, the source S14 of the fourth switch 471 is electrically connected to the first common electrode line 451, the drain D14 of the fourth switch 471 is electrically connected to the first sub pixel electrode 441. Wherein, disposing an opening 140 above the source 814 of the fourth switch 471, disposing the other opening 141 above the branch 4512 of the first common electrode line 451, a conductive layer 142 connects the source S14 of the fourth switch 471 to the branch 4512 of the first common electrode line 451 through the openings 140 and 141. The material of the conductive layer 142 is preferably the same as the pixel electrode 44.

The gate G15 of the fifth switch 472 is electrically connected to the second scanning line 43, the source S15 of the fifth switch 472 is electrically connected to the second common electrode line 452, the drain D15 of the fifth switch 472 is electrically connected to the second sub pixel electrode 442. Wherein, disposing an opening 150 above the source S15 of the fifth switch 472, disposing the other opening 151 above the branch 4522 of the second common electrode line 452, a conductive layer 152 connects the source S15 of the fifth switch 472 to the branch 4522 of the second common electrode line 452 through the openings 150 and 151. The material of the conductive layer 152 is preferably the same as the pixel electrode 44.

In the present embodiment, there is a liquid crystal layer (not shown) disposed above the first sub pixel electrode 441, the first common electrode line 451 is disposed below the first sub pixel electrode 441. Therefore, a first liquid crystal capacitor CLC1 is formed between the first sub pixel electrode 441 and the liquid crystal layer, a first storage capacitor CST1 (as shown in FIG. 5) is formed between the first sub pixel electrode 441 and the first common electrode line 451. Similarly, there is a liquid crystal layer (not shown) disposed above the second sub pixel electrode 442, the second common electrode 452 is disposed below the second sub pixel electrode 442, Therefore, the second liquid crystal capacitor CLC2 is formed between the second sub pixel electrode 442 and the liquid crystal layer, the second storage capacitor CST2 (as shown in FIG. 5) is formed between the second sub pixel electrode 442 and the second common electrode 452.

Notably, the pixel structure 40 shown in FIG. 4 represents one of pixel structure in the equivalent circuit shown in FIG. 5. The protective range of the present invention is that as long as meeting the pixel structure in the circuit shown in FIG. 5.

Figure 6:
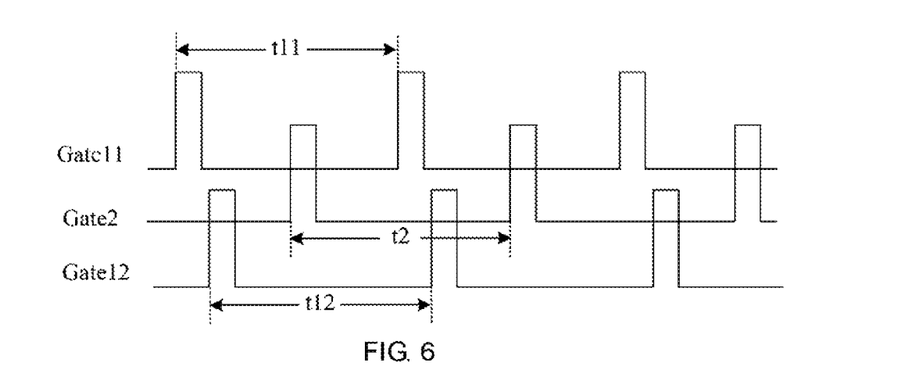
FIG. 6 is a driving waveform of the first scanning line and the second scanning line shown in FIG. 4.

The following describes the working principle of the pixel structure 40:

Referring to FIG. 6, FIG. 6 is a driving waveform of the first sub scanning line 421, the second sub scanning line 422 and the second scanning line 43. The first sub scanning line 421 is used to transmit a first sub scanning signal Gate11 of turning on the first switch 461 and the second switch 462, the data line 41 provides a pixel electrode voltage to the first sub pixel electrode 441 and the second sub pixel electrode 442 through the first switch 461 and the second switch 462 which have turned on, charging the first sub pixel electrode 441 and the second sub pixel electrode 442. After the charge, the second sub scanning line 422 transmits the second sub scanning signal Gate12 to turn on the third switch 463, the first sub pixel electrode 441 and the second sub pixel electrode 442 discharge, after the discharge, when the first sub pixel electrode 441 and the second sub pixel electrode 442 are in the state of holding power, the second scanning line 43 transmits the second scanning signal Gate2 to turn on the fourth switch 471 and the fifth switch 472, the first common electrode line 451 and the second common electrode line 452 respectively provides the common voltage to the first sub pixel electrode 441 and the second sub pixel electrode 442 through the fourth switch 471 and the fifth switch 472 which have turned on, in order to rise the pixel electrode voltage to the common voltage, achieving that inserting the black image.

In the present embodiment, the period t11, t12 and t2 of the first sub scanning signal Gate11, the second sub scanning signal Gate12 and the second scanning signal Gate2 are the same. The second scanning line 43 preferably transmits the second scanning signal Gate2 in the ½ t11 of the first sub scanning signal Gate11.

Similarly, on one hand the pixel structure 40 in the present embodiment can ensure the charging time of the pixel electrode 44 and the resolution of the liquid crystal display device, on the other hand achieving the inserting black image technique, further reducing the 3D cross talk.

Figure 7:
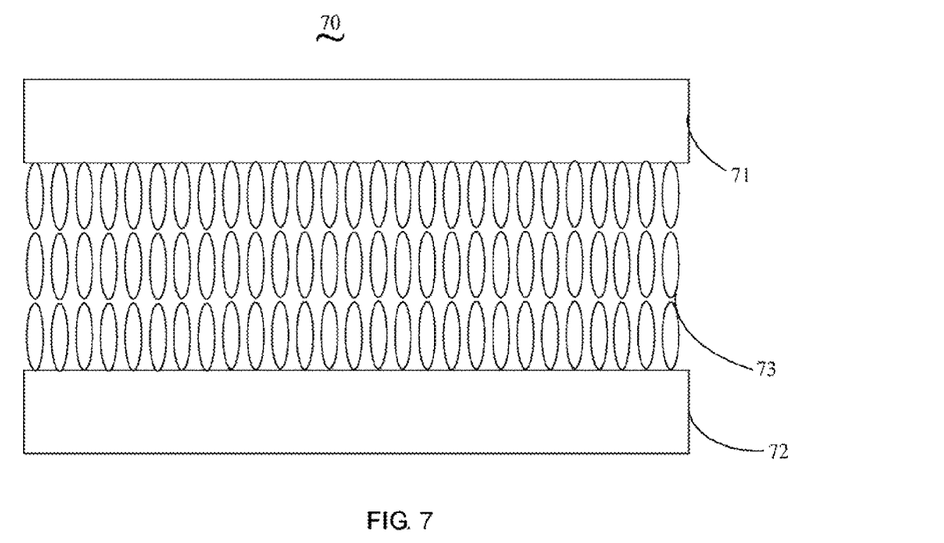
FIG. 7 is a schematic structural diagram of an embodiment of the liquid crystal display device in the present invention.

Referring to FIG. 7, FIG. 7 is a schematic structural diagram of an embodiment of the liquid crystal display device in the present invention. As shown in FIG. 7, the liquid crystal display device 70 in the present invention comprises an oppositely disposed array substrate 71 a color film substrate 72 and a liquid crystal layer 73 which is disposed between the array substrate 71 and the color film substrate 72, wherein, the array substrate 71 comprises the pixel structure described above.

Figure 8:
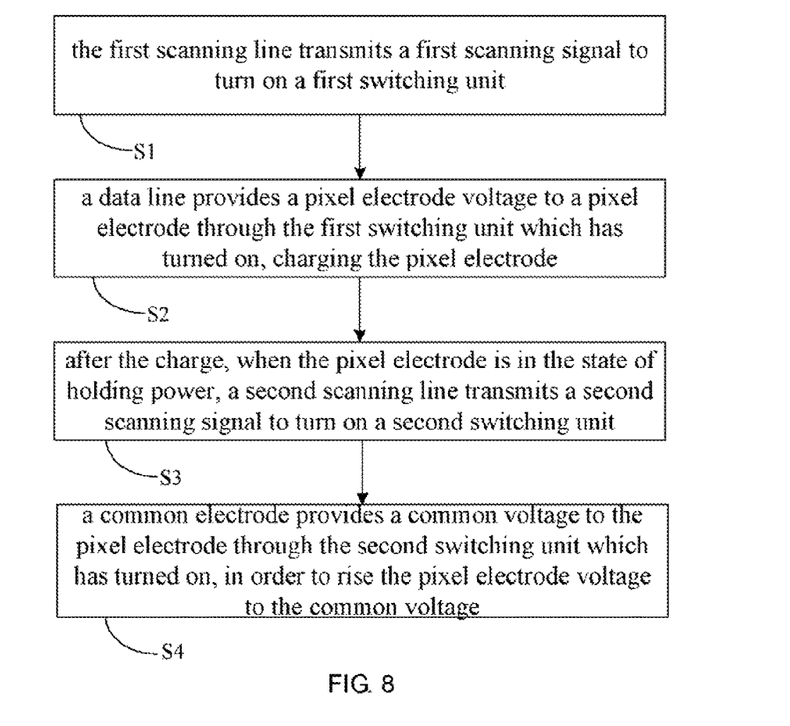
FIG. 8 is a flow chart of the driving method of the pixel structure in the present invention.

Referring to FIG. 8, FIG. 8 is a flow chart of the driving method of the pixel structure in the present invention. Wherein, the pixel structure in the present embodiment is the one described above, specifically, the pixel structure in the present embodiment comprises a data line, a first scanning line which is orthogonal to the data line, a second scanning line which is in parallel with the first scanning line, a pixel electrode which is provided between the first scanning line and the second scanning line and a common electrode line which is used for providing common voltage, the pixel structure also comprises the first switching unit which is electrically connected with the first scanning line and the second scanning unit which is electrically connected with the second scanning line. As shown in FIG. 8, the driving method of the pixel structure in the present embodiment comprises the following steps:

Step S1: the first scanning line is used to transmit a scanning signal of the first switching unit.

Step S2: the data line provides a pixel electrode voltage to the pixel electrode through the first switching unit which has turned on, charging the pixel electrode.

Step S3: after the charge, when the pixel electrode is in the state of holding power, the second scanning line transmits the second scanning signal to turn on the second switching unit.

In the step S3, the period t1 and t2 of the first scanning signal and the second scanning signal are the same. And the second scanning line preferably transmits the second scanning signal in the ½ t1 of the first scanning signal.

Step S4: the common electrode line provides the common voltage to the pixel electrode through the second switching unit which has turned on, in order to rise the pixel electrode voltage to the common voltage.

In summary, the pixel structure in the present invention turns on the first switching unit through that the first scanning line transmits the first signal, it makes the data line provide a pixel electrode voltage to the pixel electrode through the first switching unit which has turned on, charging the pixel electrode. After the charge, when the pixel electrode is in the state of holding power, the second scanning line transmits the second scanning signal to turn on the second switching unit, the common electrode line provides the common voltage to the pixel electrode through the second switching unit which has turned on, in order to rise the pixel electrode voltage to the common voltage, achieving that inserting the black image. Through above ways, on one hand the present invention can ensure the charging time of the pixel electrode and the resolution of the liquid crystal display device, on the other hand inserting the black image, achieving the inserting black image technique, reducing the 3D cross talk.

The preferred embodiments according to the present invention are mentioned above, which cannot be used to define the scope of the right of the present invention. Those variations of equivalent structure or equivalent process according to the present specification and the drawings or directly or indirectly applied in other areas of technology are considered encompassed in the scope of protection defined by the claims of the present invention.

What is claimed is:

1. A pixel structure, wherein, the pixel structure comprises a data line, a first scanning line which is orthogonal to the data line, a second scanning line which is in parallel with the first scanning line, a pixel electrode which is provided between the first scanning line and the second scanning line and a common electrode line which is used for providing common voltage, the pixel structure also comprises a first switching unit which is electrically connected with the first scanning line and a second switching unit which is electrically connected with the second scanning line; wherein, the first scanning line is used to transmit a scanning signal of the first switching unit, the data line provides a pixel electrode voltage to the pixel electrode through the first switching unit which has turned on, charging the pixel electrode, after the charge, when the pixel electrode is in the state of holding power, the second scanning line transmits the second scanning signal to turn on the second switching unit, the common electrode line provides the common voltage to the pixel electrode through the second switching unit which has turned on, in order to rise the pixel electrode voltage to the common voltage, the pixel electrode comprises a first sub pixel electrode and a second sub pixel electrode, the common electrode line comprises a first common electrode line and a second common electrode line, the first switching unit comprises a first switch, a second switch and a third switch, the second switching unit comprises a fourth switch and a fifth switch, the first scanning line comprises a first sub scanning line and a second sub scanning line, the first scanning signal comprises a first sub scanning signal and a second sub scanning signal;

wherein, the first sub scanning line is used to transmit the first sub scanning signal which turns on the first switch and the second switch, the data line provides the pixel electrode voltage to the first sub pixel electrode and the second sub pixel electrode through the first switch and the second switch which have turned on, charging the first sub pixel electrode and the second sub pixel electrode, after the charge, the second sub scanning line transmits the second sub scanning signal to turn on the third switch, the first sub pixel electrode and the second sub pixel electrode discharge, after the discharge, the first sub pixel electrode and the second sub pixel electrode are in the state of holding power, the second scanning line transmits the second scanning signal, in order to turn on the fourth switch and the fifth switch, the first common electrode line and the second common electrode line respectively provide the common voltage to the first sub pixel electrode and the second sub pixel electrode through the fourth switch and the fifth switch which have turned on, in order to rise the pixel electrode voltage to the common voltage, wherein, the third switch is electrically connected with the common electrode line through a sharing capacitor, and the sharing capacitor is different from capacitors comprising the first sub pixel electrode or the second sub pixel electrode.

2. The pixel structure as claimed in claim 1, wherein, the gate of the first switching unit is electrically connected to the first scanning line, the source of the first switching unit is electrically connected to the data line, the drain of the first switching unit is electrically connected to the pixel electrode;

the gate of the second switching unit is electrically connected to the second scanning line, the source of the second switching unit is electrically connected to the common electrode line, the drain of the second switching unit is electrically connected to the pixel electrode.

3. The pixel structure as claimed in claim 1, wherein, the period of the first scanning signal is t1, the second scanning line transmits the second scanning signal in the ½ t1 of the first scanning signal.

4. The pixel structure as claimed in claim 1, wherein, the first sub switch is electrically connected with the first sub scanning line, the data line and the first sub pixel electrode;

the second switch is electrically connected with the first sub scanning line, the data line and the second sub pixel electrode;

the third switch is further electrically connected with the second sub scanning line and the fifth switch;

the fourth switch is electrically connected with the first sub pixel electrode, the second scanning line and the first common electrode;

the fifth switch is electrically connected with the second sub pixel electrode, the second scanning line and the second common electrode.

5. The pixel structure as claimed in claim 4, wherein, the gate of the first switch is electrically connected to the first sub scanning line, the source of the first switch is electrically connected to the data line, the drain of the first switch is electrically connected to the first sub pixel electrode;

the gate of the second switch is electrically connected to the first sub scanning line, the source of the second switch is electrically connected to the data line, the drain of the second switch is electrically connected to the second sub pixel electrode;

the gate of the third switch is electrically connected to the second sub scanning line, the source of the third switch is electrically connected to the common electrode line through the sharing capacitor, the drain of the third switch is electrically connected to the drain of the fifth switch;

the gate of the fourth switch is electrically connected to the second scanning line, the source of the fourth switch is electrically connected to the first common electrode line, the drain of the fourth switch is electrically connected to the first sub pixel electrode;

the gate of the fifth switch is electrically connected to the second scanning line, the source of the fifth switch is electrically connected to the second common electrode line, the drain of the fifth switch is electrically connected to the second sub pixel electrode.

6. The pixel structure as claimed in claim 1, wherein, the period of the first sub scanning signal is t11, the second scanning line transmits the second scanning signal in the ½ t11 of the first sub scanning signal.

7. A liquid crystal display device, wherein, the liquid crystal display device comprises an oppositely disposed array substrate and a color film substrate, wherein, the array substrate comprises a pixel structure, the pixel structure comprises a data line, a first scanning line which is orthogonal to the data line, a second scanning line which is in parallel with the first scanning line, a pixel electrode which is provided between the first scanning line and the second scanning line and a common electrode line which is used for providing common voltage, the pixel structure also comprises a first switching unit which is electrically connected with the first scanning line and a second switching unit which is electrically connected with the second scanning line;

wherein, the first scanning line is used to transmit a scanning signal of the first switching unit, the data line provides a pixel electrode voltage to the pixel electrode through the first switching unit which has turned on, charging the pixel electrode, after the charge, when the pixel electrode is in the state of holding power, the second scanning line transmits the second scanning signal to turn on the second switching unit, the common electrode line provides the common voltage to the pixel electrode through the second switching unit which has turned on, in order to rise the pixel electrode voltage to the common voltage;

wherein, the pixel electrode comprises a first sub pixel electrode and a second sub pixel electrode, the common electrode line comprises a first common electrode line and a second common electrode line, the first switching unit comprises a first switch, a second switch and a third switch, the second switching unit comprises a fourth switch and a fifth switch, the first scanning line comprises a first sub scanning line and a second sub scanning line, the first scanning signal comprises a first sub scanning signal and a second sub scanning signal;

wherein, the first sub scanning line is used to transmit the first sub scanning signal which turns on the first switch and the second switch, the data line provides the pixel electrode voltage to the first sub pixel electrode and the second sub pixel electrode through the first switch and the second switch which have turned on, charging the first sub pixel electrode and the second sub pixel electrode, after the charge, the second sub scanning line transmits the second sub scanning signal to turn on the third switch, the first sub pixel electrode and the second sub pixel electrode discharge, after the discharge, the first sub pixel electrode and the second sub pixel electrode are in the state of holding power, the second scanning line transmits the second scanning signal, in order to turn on the fourth switch and the fifth switch, the first common electrode line and the second common electrode line respectively provide the common voltage to the first sub pixel electrode and the second sub pixel electrode through the fourth switch and the fifth switch which have turned on, in order to rise the pixel electrode voltage to the common voltage, wherein, the third switch is electrically connected with the common electrode line through a sharing capacitor, and the sharing capacitor is different from capacitors comprising the first sub pixel electrode or the second sub pixel electrode.

8. The liquid crystal display device as claimed in claim 7, wherein, the gate of the first switching unit is electrically connected to the first scanning line, the source of the first switching unit is electrically connected to the data line, the drain of the first switching unit is electrically connected to the pixel electrode;

the gate of the second switching unit is electrically connected to the second scanning line, the source of the second switching unit is electrically connected to the common electrode line, the drain of the second switching unit is electrically connected to the pixel electrode.

9. The liquid crystal display device as claimed in claim 7, wherein, the period of the first scanning signal is t1, the second scanning line transmits the second scanning signal in the ½ t1 of the first scanning signal.

10. The liquid crystal display device as claimed in claim 7 wherein, the first sub switch is electrically connected with the first sub scanning line, the data line and the first sub pixel electrode;

the second switch is electrically connected with the first sub scanning line, the data line and the second sub pixel electrode;

the third switch is further electrically connected with the second sub scanning line and the fifth switch;

the fourth switch is electrically connected with the first sub pixel electrode, the second scanning line and the first common electrode;

the fifth switch is electrically connected with the second sub pixel electrode, the second scanning line and the second common electrode.

11. The liquid crystal display device as claimed in claim 10, wherein, the gate of the first switch is electrically connected to the first sub scanning line, the source of the first switch is electrically connected to the data line, the drain of the first switch is electrically connected to the first sub pixel electrode;

the gate of the second switch is electrically connected to the first sub scanning line, the source of the second switch is electrically connected to the data line, the drain of the second switch is electrically connected to the second sub pixel electrode;

the gate of the third switch is electrically connected to the second sub scanning line, the source of the third switch is electrically connected to the common electrode line through the sharing capacitor, the drain of the third switch is electrically connected to the drain of the fifth switch;

the gate of the fourth switch is electrically connected to the second scanning line, the source of the fourth switch is electrically connected to the first common electrode line, the drain of the fourth switch is electrically connected to the first sub pixel electrode;

the gate of the fifth switch is electrically connected to the second scanning line, the source of the fifth switch is electrically connected to the second common electrode line, the drain of the fifth switch is electrically connected to the second sub pixel electrode.

12. The liquid crystal display device as claimed in claim 7, wherein, the period of the first sub scanning signal is t11, the second scanning line transmits the second scanning signal in the ½ t11 of the first sub scanning signal.

* * * * *